United States Patent [19]
Mase et al.

[11] Patent Number: 5,543,947
[45] Date of Patent: Aug. 6, 1996

[54] METHOD OF DRIVING AN LCD EMPLOYING AN ACTIVE MATRIX WITH SHORT PULSES FOR GRAY SCALE

[75] Inventors: Akira Mase, Aichi; Masaaki Hiroki; Yasuhiko Takemura, both of Kanagawa; Shunpei Yamazaki, Tokyo, all of Japan

[73] Assignee: Semiconductor Energy Laboratory Co., Ltd., Kanagawa-ken, Japan

[21] Appl. No.: 240,499

[22] Filed: May 10, 1994

Related U.S. Application Data

[62] Division of Ser. No. 885,738, May 19, 1992, abandoned.

[30] Foreign Application Priority Data

May 21, 1991 [JP] Japan ................. 3-145566
Apr. 14, 1992 [JP] Japan ................. 4-120142

[51] Int. Cl.⁶ ................................. G02F 1/133
[52] U.S. Cl. ................. 359/84; 359/56; 359/59; 345/148; 345/89
[58] Field of Search ................. 359/55, 57, 58, 359/59, 84, 56; 340/784; 345/97, 98, 148; 6/89

[56] References Cited

U.S. PATENT DOCUMENTS

| | | | |
|---|---|---|---|
| 4,380,008 | 5/1983 | Kawakami et al. | 359/55 |
| 4,413,256 | 11/1983 | Yasuda et al. | 359/55 |
| 4,605,972 | 8/1986 | Hatanaka | 359/55 |
| 4,641,156 | 2/1987 | Ohta et al. | 359/55 |
| 4,709,995 | 12/1987 | Kuribayashi et al. | 359/56 |
| 4,769,713 | 9/1988 | Yasui | 345/89 |
| 4,783,145 | 11/1988 | Hatanaka et al. | 359/55 |
| 4,808,991 | 2/1989 | Tachiuchi et al. | 359/55 |
| 4,818,077 | 4/1989 | Ohwada et al. | 359/59 |
| 4,836,654 | 6/1989 | Fujimura et al. | 359/55 |
| 4,884,079 | 11/1989 | Inoue et al. | 359/55 |
| 4,929,058 | 5/1990 | Numao | 359/55 |
| 4,938,565 | 7/1990 | Ichikawa | 359/59 |
| 5,117,298 | 5/1992 | Hirai | 359/55 |
| 5,165,075 | 11/1992 | Hirdei et al. | 359/59 |
| 5,280,280 | 1/1994 | Hotto | 345/94 |
| 5,349,366 | 9/1994 | Yamazaki et al. | 359/59 |
| 5,414,442 | 5/1995 | Yamazaki et al. | 345/89 |

FOREIGN PATENT DOCUMENTS

| | | |
|---|---|---|
| 0144297 | 12/1978 | Japan . |
| 0081621 | 5/1984 | Japan . |
| 0096636 | 4/1988 | Japan . |
| 0159826 | 7/1988 | Japan . |
| 0089030 | 3/1990 | Japan . |

*Primary Examiner*—William L. Sikes
*Assistant Examiner*—Kenneth Parker
*Attorney, Agent, or Firm*—Sixbey, Friedman, Leedom & Ferguson; Gerald J. Ferguson, Jr; Evan R. Smith

[57] ABSTRACT

Method of driving a liquid crystal electro-optical device in such a way that the device produces accurate gray tones with high reproducibility. In this device, a complementary TFT (thin film transistor) configuration consisting of at least one p-channel TFT and at least one n-channel TFT is formed per pixel electrode. One of the input/output terminals of this configuration is connected to the pixel electrode. The other is connected to a first signal line. All the gate electrodes of the TFTs of the configuration are connected to a second signal line. High-speed pulses are applied to one of the input/output terminals of the TFT configuration via the first signal line. A high-speed bipolar signal is applied to the gate electrodes in synchronism with the pulses, to electrically charge the pixel. After the completion of the charging, the bipolar signal is again applied to the gate electrodes to discharge the pixel. This series of operations is repeated to produce halftones.

8 Claims, 12 Drawing Sheets

FIG. 4A
FIG. 4C
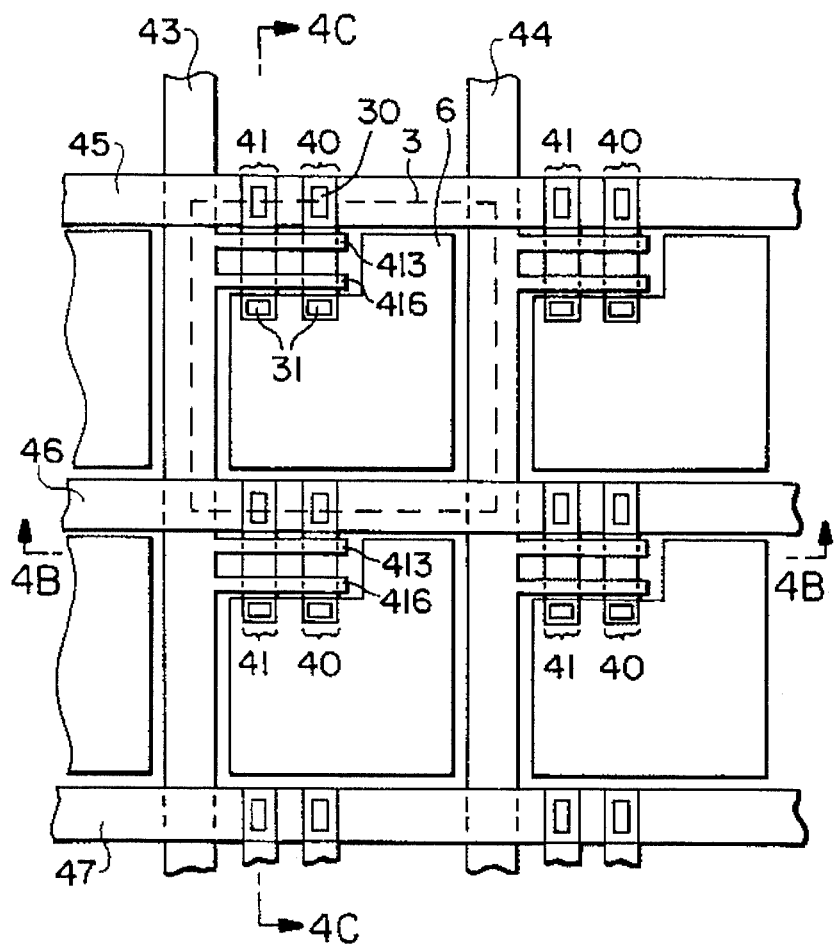
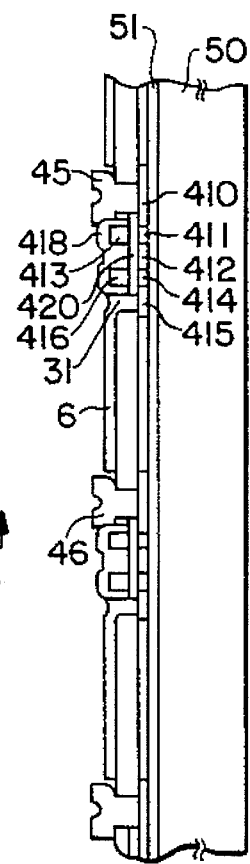
FIG. 4B
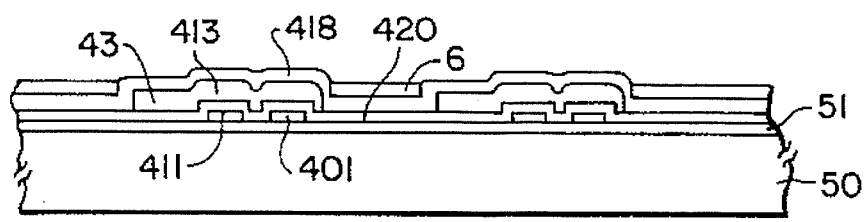

FIG. 7A
FIG. 7C
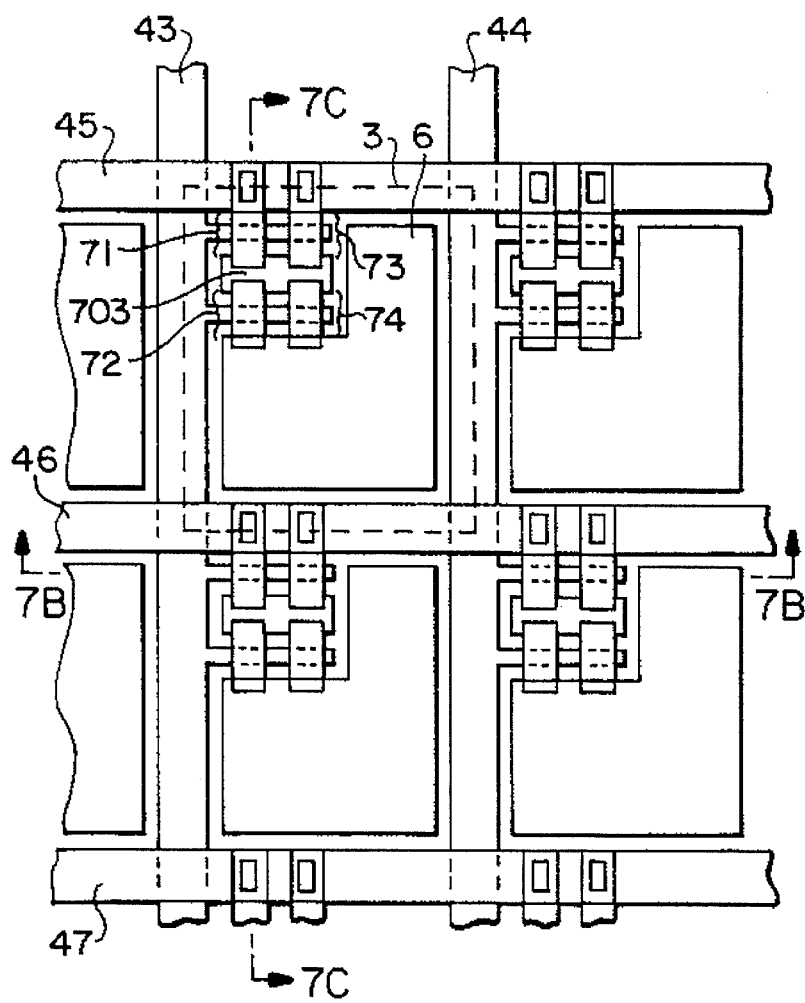
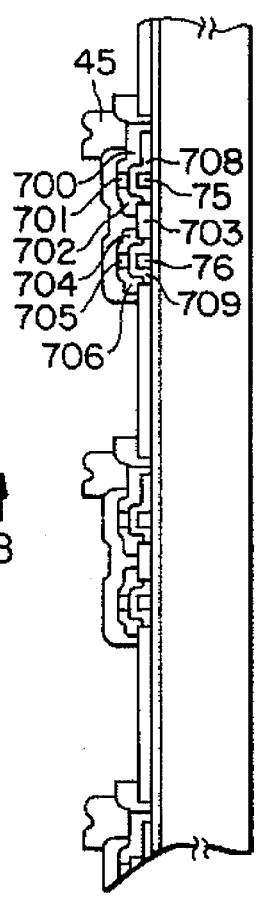
FIG. 7B
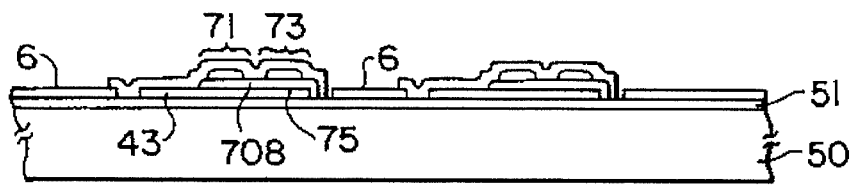

METHOD OF DRIVING AN LCD EMPLOYING AN ACTIVE MATRIX WITH SHORT PULSES FOR GRAY SCALE

This application is a divisional of Ser. No. 07/885,738, filed May 19, 1992, now abandoned.

FIELD OF THE INVENTION

The present invention relates to a method of driving an electro-optical device, more particularly, to a method of displaying a digital image on an electro-optical device using thin film transistors (TFTs) as driving switching elements and to a method of producing gray tones to display halftone images.

BACKGROUND OF THE INVENTION

Liquid crystal materials exhibit such characteristics that the dielectric constant measured parallel to the molecular axis is different from the dielectric constant measured vertical to the molecular axis. Therefore, it is easy to line up the molecules either parallel or vertical to the external electric field. A liquid crystal electro-optical device controls the amount of light transmitted or scattered, utilizing this anisotropy of dielectric constant. In this way, desired portions are made dark or light. Known liquid crystal materials include twisted nematic liquid crystals, super twisted nematic liquid crystals, ferroelectric liquid crystals, polymeric liquid crystals, and dispersion liquid crystals. It is known that liquid crystals respond to the external voltage not after an infinitely short period but after some time. The time is different among liquid crystal materials and intrinsic to each different liquid crystal material. For twisted nematic liquid crystals, the time is tens of milliseconds. For super twisted nematic liquid crystals, the time is hundreds of milliseconds. For ferroelectric liquid crystals, the time is hundreds of microseconds. For dispersion and polymeric liquid crystals, the time is tens of milliseconds.

Of the liquid crystal electro-optical devices using liquid crystals, the active-matrix type has offered the highest image quality. In the prior art active-matrix liquid crystal electro-optical device, thin film transistors (TFTs) are used as active elements for activating liquid crystal pixels. An amorphous or polycrystalline semiconductor is employed as each TFT. A TFT of either p-type or n-type is used for each one pixel. Generally, an n-channel TFT is connected in series with each pixel. FIG. 2 is a schematic equivalent circuit diagram of the prior art activematrix liquid crystal electro-optical device. The liquid crystal portion of one pixel is indicated by 22. An n-channel TFT 21 is connected in series with this liquid crystal portion 22. Such pixels are arranged in rows and columns. Generally, a very large number of pixels such as 840×480 or 1280×980 pixels are arranged. In this figure, only a matrix of 2×2 pixels is shown for simplicity. Signals are applied from peripheral circuits 28 and 27 to the pixels to selectively turn on and off the pixels. Where the switching characteristics of the TFTs are good, it is generally possible to obtain a high contrast from this liquid crystal electro-optical device.

However, in such a liquid crystal electro-optical device fabricated in practice, the output signal from each TFT, or the input voltage $V_{LC}$ 20 (hereinafter referred to as the liquid crystal potential) to the liquid crystal, often fails to go high when it should go high. Conversely, the voltage sometimes fails to go low when it should go low. This phenomenon occurs because the TFT acting as a switching device applying a signal to the pixel assumes asymmetric states when it is turned on and off.

The liquid crystal 22 is intrinsically insulative in operation. When the TFT is OFF, the liquid crystal potential $V_{LC}$ is in a floating condition. This liquid crystal 22 is a capacitor in terms of an equivalent circuit. The potential $V_{LC}$ is determined by the electric charge stored in this capacitor. This charge leaks when the resistance $R_{LC}$ 24 of the liquid crystal is small or when dust or ionic impurities are present in the liquid crystal. If a resistance $R_{GS}$ 25 is produced between the gate electrode and the input or output terminal of the TFT 21 because of pinholes created in the gate insulating film on the TFT 21, then the charge leaks from this location. As a result, the potential $V_{LC}$ 20 takes a halfway value. In a liquid crystal display comprising a panel having 200 thousand to 5 million pixels, as many TFTs exist. Therefore, the abovedescribed problem takes place. This makes it impossible to accomplish a high production yield.

Although it is easy for most liquid crystal materials to produce two states, i.e., ON and OFF states, it is difficult to yield intermediate states. In the past, a thin film transistor (TFT) has been formed at each pixel using a liquid crystal. Thus, a so-called active-matrix circuit is formed. A method of producing gray tones has been proposed. In particular, the voltage applied to the liquid crystal of the pixel is subtly adjusted by the use of the TFT to give rise to such gray tones. However, the characteristics of the TFTs of the pixels vary in the range of as large as about 10%. The tolerable range of voltages for making the liquid crystal produce gray levels between black and white is narrow. For example, in the case of twisted nematic liquid crystals that are typical liquid crystal materials, the tolerable voltage range is usually only 10% or so of the threshold voltage of the liquid crystal. Hence, it is quite difficult to accomplish a gray scale by controlling the voltages. This means that the liquid crystal display is quite disadvantageous in competing with the CRT display which is a generally adopted display unit.

SUMMARY OF THE INVENTION

It is an object of the present invention to provide a method of displaying an image with gray tones.

It is another object of the invention to provide a method of solving the foregoing problems arising from asymmetrical states assumed by elements driving the pixels when the elements are turned on and off, i.e., the potentials applied to the display portions do not sufficiently settle in state 0 or 1, and their levels drift during one frame.

In order to achieve these objects in an electro-optical device comprising a plurality of pixels arranged in rows and columns on a substrate, each pixel comprises at least one complementary TFT configuration comprising at least one p-channel TFT and at least one n-channel TFT as means for driving the pixel, rather than only one of p-channel TFT and n-channel TFT. Said at least one complementary TFT configuration is connected to a corresponding pixel electrode in complementary structure. If necessary, plural such complementary TFT configurations are provided for each one pixel. In this case, if any one of the complementary TFT configurations malfunctions, then the remaining TFT configurations operating normally performs the desired function. One of the input/output terminals is connected to the pixel electrode, while the other is connected to a first signal line.

Where plural complementary transistors are provided, the input/output terminals of these complementary thin film transistors are connected in series. One of the input/output terminals is connected to the pixel electrode, the other being connected to the first signal line. All the gate electrodes of said plural complementary transistors are connected to a second signal line.

Another liquid crystal electro-optical device according to the invention has a plurality of pixels arranged in rows and columns on a substrate, and further includes plural p-channel TFTs and plural n-channel TFTs for each one pixel electrode. The input/output terminals of the source and drain regions of the p-channel TFTs are connected in series. One of these input/output terminals is connected to the pixel electrode, while the other is connected to a first signal line. The input/output terminals of the source and drain regions of the n-channel TFTs are connected in series. One of these input/output terminals is connected to the pixel electrode, whereas the other is connected to the first signal line. All the gate electrodes of the plural TFTs are connected to a common second signal line.

In each complementary TFT pair, one of the input/output terminals of the n-channel TFT and one of the input/output terminals of the p-channel TFT are connected to each other. The gate electrode of the p-channel TFT is connected with the gate electrode of the n-channel TFT. These connected terminals act as the source, drain, and gate electrode. This complementary TFT pair is referred collectively to as transfer gate type in the present invention.

Other objects and features of the invention will appear in the course of the description thereof which follows.

BRIEF DESCRIPTION OF THE DRAWINGS

FIG. 4(A) is a plan view of the device shown in FIG. 3;

FIG. 4, (B) and (C), are cross-sectional views taken on lines A—A' and B—B', respectively, of FIG. 4(A);

FIG. 7(A) is a plan view of another liquid crystal electro-optical device according to the invention;

FIG. 7, (B) and (C), are cross-sectional views taken on lines A—A' and B—B', respectively, of FIG. 7(A).

DETAILED DESCRIPTION OF THE INVENTION

Figure 1:
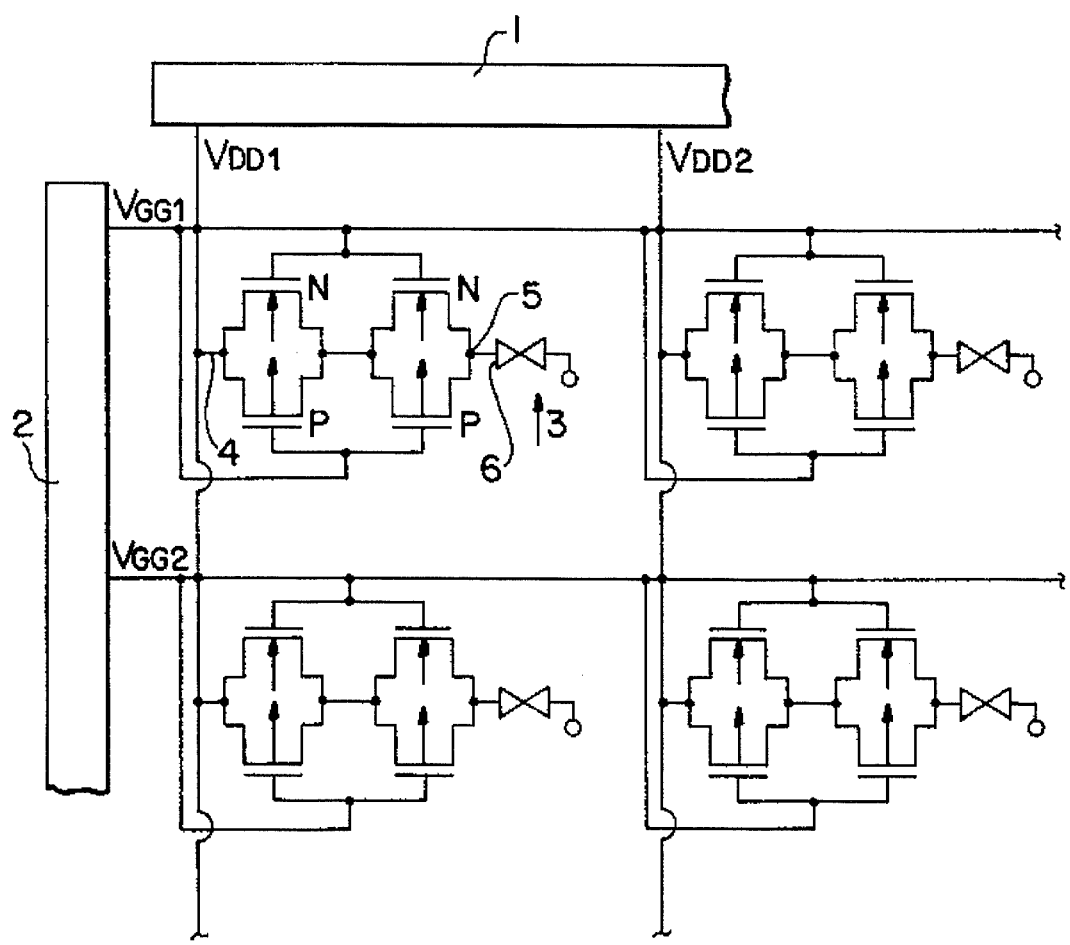
FIG. 1 is a schematic view of a 2×2 matrix liquid crystal electro-optical device according to the present invention.
Figure 2:
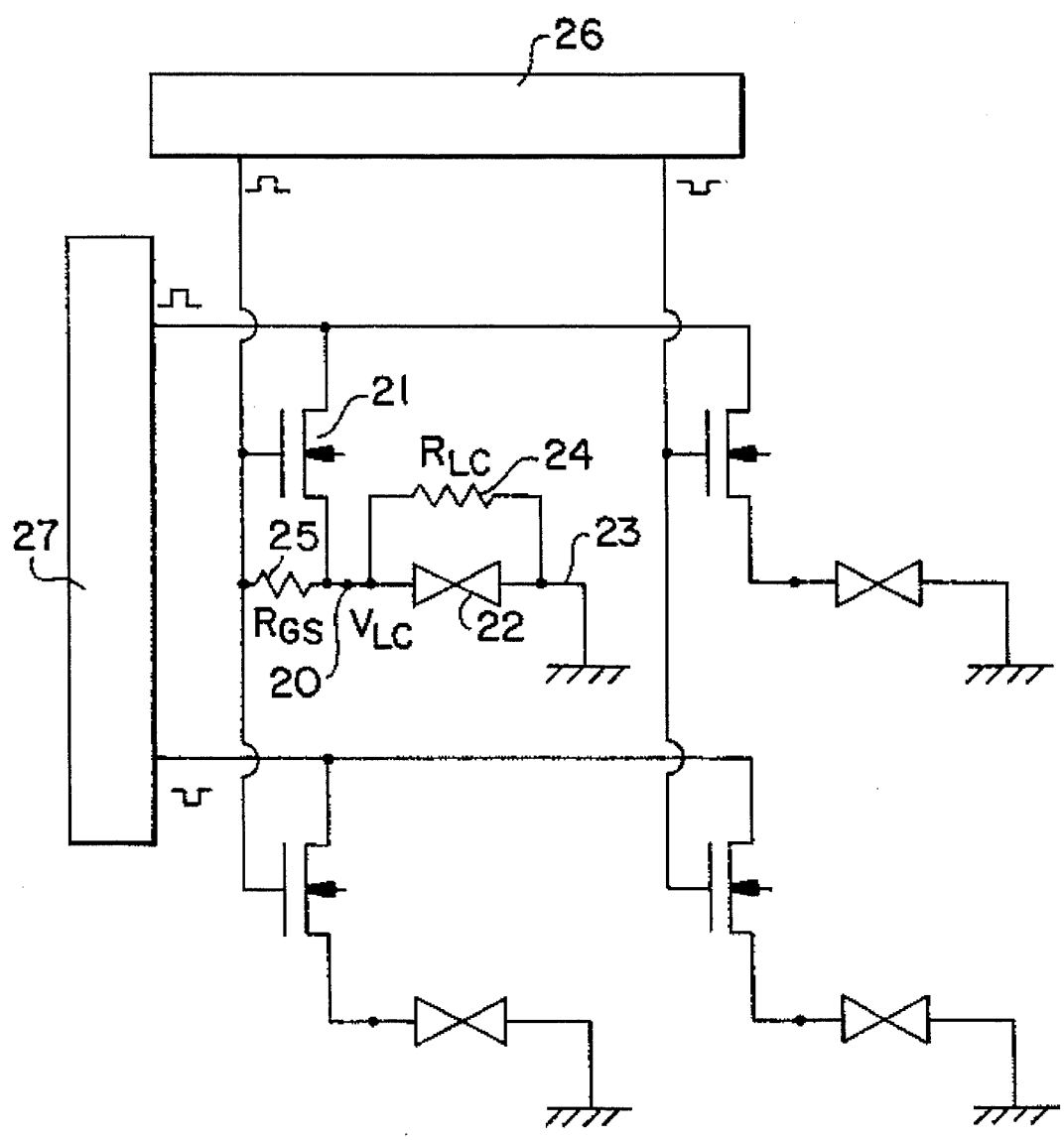
FIG. 2 is a circuit diagram of a conventional liquid crystal electro-optical device.

Referring to FIG. 1, there is shown a 2×2 active matrix liquid crystal electro-optical device according to the invention. This device is driven by peripheral circuits 1 and 2. Two complementary TFT pairs each consisting of a p-channel TFT (thin film transistor) and an n-channel TFT are connected with one pixel 3. As described already, if any one complementary TFT pair malfunctions, e.g., a short circuit or leakage occurs between the source and drain, the desired operation is performed. Accordingly, where only one pair of complementary TFTs is provided, no problems will arise in embodying the present invention. In FIG. 1, the source and drain regions of the p- and n-channel TFTs of each complementary TFT pair are electrically connected with each other. The inputs and outputs of these two complementary TFT pairs are connected in series with the pixel electrode. One input/output 4 is connected with the corresponding signal line $V_{DD1}$ of signal lines arranged in rows and columns. The other input/output 5 is connected with the pixel electrode 6 of the liquid crystal.

In this structure, the potential at the pixel 3 sufficiently settles in state 0 or 1 when the p- and n-channel TFTs of the complementary TFT pairs are turned on and off. The level of the potential does not drift during one frame.

Figure 3:
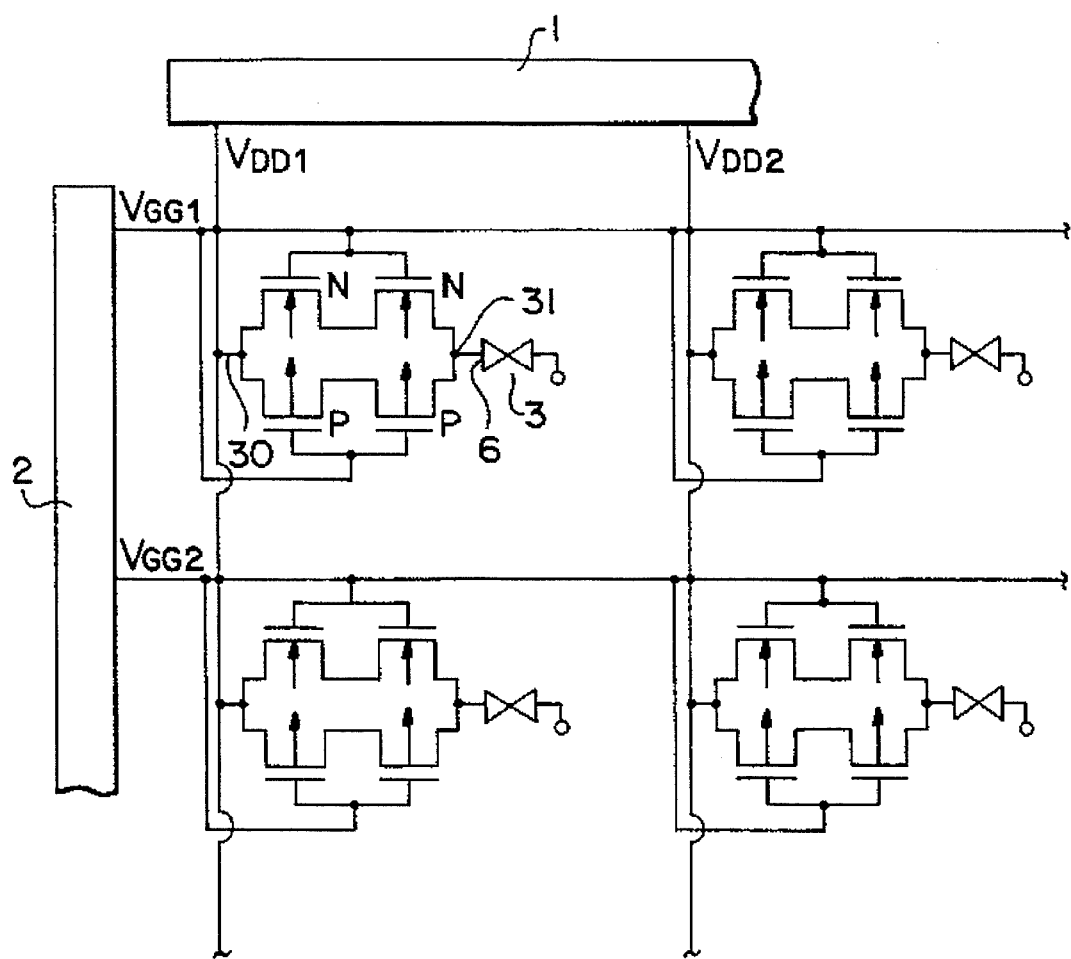
FIG. 3 is a fragmentary circuit diagram of a liquid crystal electro-optical device according to the invention.

Furthermore, because of the series connection of the two complementary TFT pairs shown in FIG. 1, the resistance is doubled compared with the resistance of an ordinary TFT. This reduces the weak leakage current produced in OFF state. Hence, the potential at the pixel 3 sufficiently settles in state 0 or 1. Referring next to FIG. 3, there is shown another 2×2 active-matrix liquid crystal electro-optical device according to the invention. Two p-channel TFTs and two n-channel TFTs are connected as a complementary TFT configuration with one pixel 3. Specifically, the source and drain regions of the two p-channel TFTs of these four TFTs are connected in series. Also, the source and drain regions of the two n-channel TFTs are connected in series. The source and drain regions of these p-channel TFTs and n-channel TFTs are electrically connected with each other to form one complementary TFT configuration. The input and output of this complementary TFT configuration are electrically connected in series with the pixel electrode. One input/output 30 is connected with the corresponding signal line $V_{DD1}$ of signal lines arranged in rows and columns. The other input/output 31 is connected with the pixel electrode 6 of the liquid crystal.

The gate electrodes of these four TFTs are connected with a common signal line $V_{GG1}$. One complementary TFT configuration consisting of the four TFTs is provided for one pixel.

In FIGS. 1 and 3, plural TFTs are connected in series with one pixel electrode. Each pair of these TFTs functions as a complementary TFT pair. Alternatively, they function as a complementary TFT configuration as a whole. If any one of the TFTs malfunctions, the operation is compensated for by the remaining TFTs. It is to be noted that the present invention is not limited to the above embodiment. The novel liquid crystal electro-optical device can be realized by incorporating more TFTs.

In the embodiment described in conjunction with FIG. 1, exactly the same function can be implemented by interchanging the positions of the p-channel and n-channel TFTs. This gives some degree of freedom to the layout of the liquid crystal electro-optical device. The use of these complementary TFT configurations makes it possible to greatly increase the switching speed of the signal voltage applied to the pixel. The increased switching speed is indispensable for the present invention. Therefore, if any conventional circuit consisting only of n-channel or p-channel TFTs is used, then the present invention cannot be implemented.

In FIGS. 1 and 3, the minimum size of matrix of 2×2 is shown. In actual display devices, pixels including these elements are arranged in rows and columns.

Figure 8:
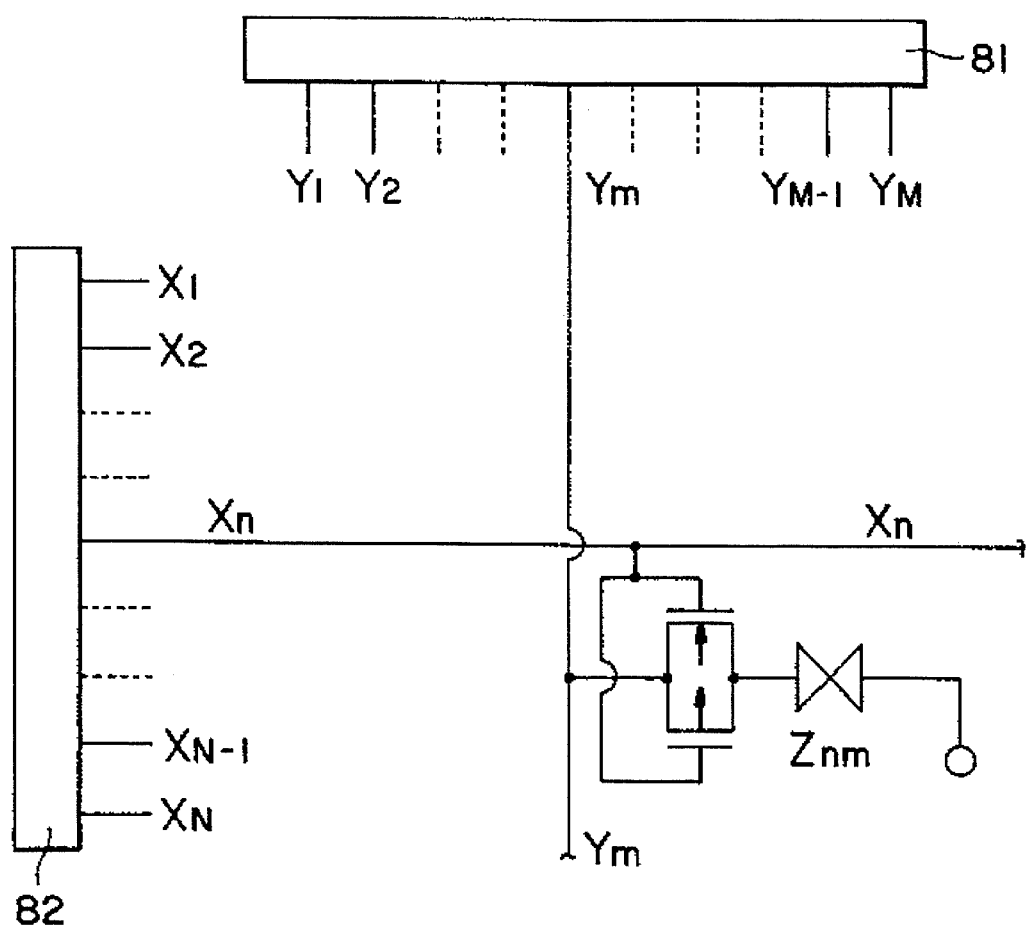
FIG. 8 is a schematic diagram illustrating the principle of the present invention.

The principle of operation of the present invention is described below. First, an N×M matrix is discussed. This matrix is schematically shown in FIG. 8. N signal lines $X_1$, $X_2, \ldots, X_n, \ldots X_N$ extend straight from a peripheral driver circuit 82. Similarly, M signal lines $Y_1, Y_2, \ldots, Y_m, \ldots Y_M$ extend straight from a peripheral driver circuit 81.

Complementary TFT configurations and liquid crystal cells (not shown) are formed at the intersections of these signal lines. Notice that only n rows and m columns are shown in FIG. 8. In particular, signal lines $X_n$ and $Y_m$, liquid crystal cell $Z_{nm}$, and a complementary TFT configuration connecting them are shown. When a positive voltage, a negative voltage, or a bipolar pulse ($X_n$ in FIG. 9) that is a combination of positive and negative voltages is applied to the signal line $X_n$ connected to the gate electrode while a voltage is being applied to the signal line $Y_m$ connected to the source (one of the input/output terminals) of the complementary TFT configuration, the complementary TFT configuration is turned on. A voltage originating from the signal line $Y_m$ is applied to the liquid crystal cell $Z_{nm}$. Also, when a positive voltage, a negative voltage, or a bipolar voltage is applied to the signal line $X_n$ while no voltage is impressed on the signal line $Y_m$, the complementary TFT configuration is turned on. In this case, however, the electric charge stored in the liquid crystal cell $Z_{nm}$ is released, and the voltage applied to the liquid crystal cell ceases. The use of the bipolar pulse is effective in operating the device at a high speed.

Gradation display in accordance with the present invention can be carried out by applying voltages having the same duration thereof to the pixel electrode n-times with n limited to an integer of N or less (n≧1; N≧1) during a period required for applying the same voltages to the pixel electrode N-times in operation of the electro-optical device.

Visible gradations can be obtained by controlling the time for which the voltage is applied to the liquid crystal. For example, where a twisted nematic liquid crystal is employed, if a voltage is applied to the liquid crystal for 200 msec during a period of 256 msec, then the resulting gray tone is darker than in the case in which the voltage is applied for 256 msec and lighter than in the case in which it is applied for 100 msec. This can be seen by considering the average time for which the liquid crystal is turned on. The present inventors who made further researches into this matter have found that where pulses (voltages) of 1 msec are applied to the liquid crystal cell (pixel electrode), the gray tone produced by applying 200 pulses (voltages) for 258 msec is midway between the gray tones produced by applying 258 pulses and 100 pulses, respectively. It is to be noted that this finding should not be taken as a matter of course, because the time of 1 msec is too short for the above-described ordinary twisted nematic liquid crystal materials, and because these twisted nematic liquid crystals do not respond within such a short time. Therefore, it should be impossible to turn on the liquid crystal even if 256 pulses are applied. In practice, however, an intermediate gray tone has been realized. The principle is not yet fully understood. Nonetheless, we have discovered that a gray scale can be attained, utilizing this phenomenon. That is, the present invention is characterized in that halftones are digitally realized by applying pulses (voltages) whose duration is shorter than a period required to change direction of a liquid crystal molecule of the liquid crystal material and controlling the number of the pulses applied per unit time. Our researches have led to the conclusion that in the case of twisted nematic liquid crystals, the duration of the pulses (voltages) must be 10 milliseconds or less to obtain halftones. The "pulse duration" is defined as follows.

A plurality of pulses are successively applied to the liquid crystal. The "pulse duration" is the time interval between the instant at which one pulse starts and the instant at which the next pulse starts. Therefore, the pulse duration is the reciprocal of the pulse repetition frequency.

Similar effects were observed with super twisted nematic liquid crystals, ferroelectric liquid crystals, polymer liquid crystals, and dispersion type liquid crystals. With any liquid crystal, halftones are obtained by applying pulses shorter than the response time of the liquid crystal. More specifically, in the case of super twisted nematic liquid crystals, gradations are derived by applying pulses (voltages) having a duration of 100 milliseconds or less, preferably 10 msec or less. In the case of ferroelectric liquid crystals, a gray scale is obtained by applying pulses (voltages) having a duration of 100 microseconds or less, preferably 10 μsec or less. In the case of polymer liquid crystals and dispersion type liquid crystals, gray tones are produced by applying pulses (voltages) having a duration of 10 milliseconds or less, preferably 1 msec or less.

Usually, in television images, 30 still images are successively displayed within 1 second to produce moving picture. Accordingly, each still image persists for about 30 msec. This time is too short for the human eye to distinguish the individual still images. In any case, in order to obtain moving picture, each still image cannot persist over 100 msec. If 256 gray tones should be obtained, using the present invention, and if each still image is made to persist for 30 msec, then it is necessary to build a circuit which divides the time of 30 msec into at least 256 and applies 256 pulses at most to the liquid crystal cell during 30 msec. The time for which one pulse persists is about 100 μsec. Such a high speed cannot be realized with the prior art n-channel TFTs. Hence, the novel complementary TFT configurations of the present invention are necessitated. Of course, more gray tones can be obtained by increasing the number of the pulses repeated during 30 msec.

Figure 9:
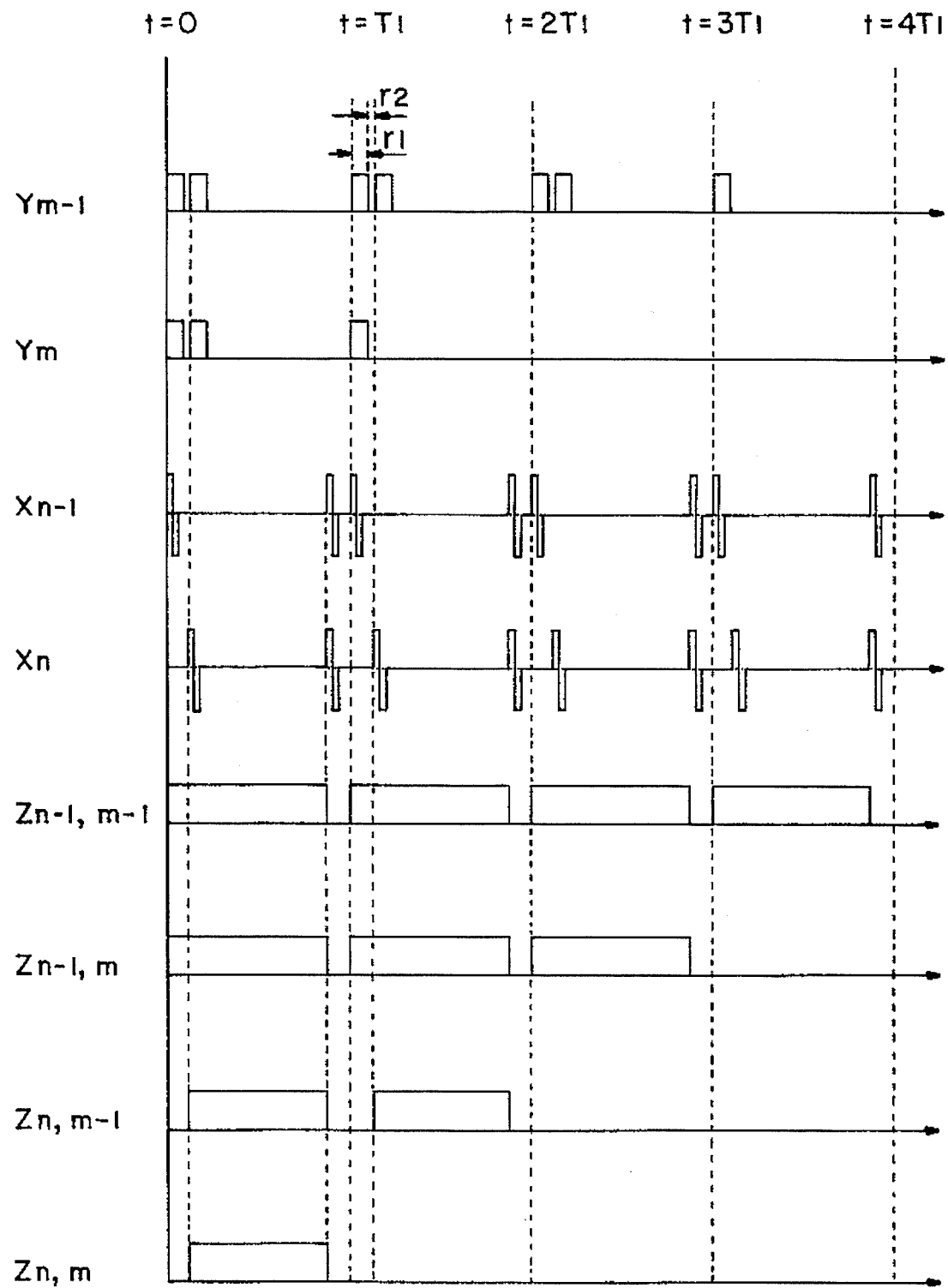
FIG. 9 is a waveform diagram of signals produced in carrying out the present invention.

One example of operation for producing gray tones in accordance with the present invention is illustrated in FIG. 9. For simplicity, the operation performed to give rise to four gray tones is now described. A gray scale consisting of 64 or 256 gray levels can be easily produced by applying this example of operation, which is next described by referring to FIGS. 9 and 10.

Referring to FIG. 9, pulse voltages are applied to signal lines $Y_1, Y_2, \ldots, Y_{m-1}, Y_m, \ldots, Y_M$. These pulse voltages are not applied to all signal lines but they are applied when it is necessary to apply voltages to pixels. To facilitate the understanding, the operation performed from the instant $t=T_1$ to the instant $t=2T_1$ is described. First, a rectangular pulse which starts at the instant $t=T_1$ and persists for $\tau_1$ is applied to both signal lines $Y_{m-1}$ and $Y_m$. A bipolar pulse is applied only to the signal line $X_{n-1}$ around the instant $t=T_1$; the bipolar pulse is not applied to the signal line $X_n$. Therefore, both liquid crystal cells $Z_{n-1,m-1}$ and $Z_{n-1,m}$ are electrically charged, so that they are turned on. Then, the first rectangular pulse is made to cease after a lapse of $\tau_1$. After a lapse of $\tau_2$, the next rectangular pulse is applied only to the signal line $Y_{m-1}$; this pulse is not applied to the signal line $Y_m$. For simplicity, it is assumed that this rectangular pulse persists also for $\tau_1$. A bipolar pulse is applied to the signal line $X_n$ substantially in synchronism with the abovedescribed rectangular pulse. However, this bipolar pulse is not applied to the signal line $X_{n-1}$. As a result, only the liquid crystal cell $Z_{n,m-1}$ is electrically charged; the cell $Z_{n,m}$ is not charged. The liquid crystal cells $Z_{n-1,m-1}$, $Z_{n-1,m}$, and $Z_{n,m-1}$ which are turned on in this way are maintained charged. Of course, the electric charge may leak via the liquid crystal, via the complementary TFT configurations, or via the peripheral circuits. Also, a circuit for gradually releasing the electric charge from the liquid crystal cells may be built. In these cases, weak electric discharge may be observed. However, most of the electric charge is kept in the liquid crystal cells.

Subsequently, a bipolar pulse is applied to the signal lines $X_{n-1}$ and $X_n$. At this time, any voltage is applied neither to the signal line $Y_{m-1}$ nor to the signal line $Y_m$ and so corresponding liquid crystal cells are not electrically charged. Rather, the charged liquid crystal cells are discharged. This process is repeated, whereby a pulse voltage persisting for about $T_1$ is applied to the liquid crystal cells. Of course, as can be understood from the description made thus far, the voltage is not kept applied.

In the embodiment shown in FIG. 9, the operation is repeated four times to form one frame of picture. That is, the duration of one frame is $4T_1$. Four pulses are applied to the cell $Z_{n-1,m-1}$ for the duration of one frame by sending signals as shown in FIG. 9. Three pulses are applied to the cell $Z_{n-1,m}$. Two pulses are applied to the cell $Z_{n,m-1}$. One pulse is applied to the cell $Z_{nm}$. The durations of these pulses are required to be so short that individual still images cannot be distinguished by the human eye and that the liquid crystal cannot follow as mentioned previously. Specifically, in the case of twisted nematic liquid crystals, the duration of each pulse is 10 msec or shorter. In the case of super twisted nematic liquid crystals, the duration is 100 msec or shorter. In the case of dispersion and polymeric liquid crystals, the duration is 10 msec or shorter. In the case of ferroelectric liquid crystals, the duration is 100 µsec or shorter. Where the number of the applied pulses is different in this way, the brightness of the liquid crystal seems different to the human eye. Consequently, halftones can be produced. More specifically, in case of polymer liquid crystals, the cell $Z_{nm}$ is brightest. The cells $Z_{n,m-1}$ $Z_{n-1,m}$ and $Z_{n-1,m-1}$ are darker in this order. That is, four gray levels can be created.

In the embodiment shown in FIG. 9, the duration of each pulse applied to the cell $Z_{n-1,m-1}$ is somewhat different from the duration of the pulse applied to the cell $Z_{nm}$. If their difference is small, no visual problems take place. However, in the case of twisted nematic liquid crystals, if the difference between the pulse durations exceeds 20%, then the brightness seems different though the same number of pulses are applied. In this case, the color and the brightness differ from location to location. This problem is solved by the method illustrated in FIG. 10. In this method, the durations of the pulses applied to the pixels can be made substantially equal.

Also in this case, the operation performed from the instant $t=T_1$ to the instant $t=2T_1$ is described. First, any pulse voltage is applied neither to the signal line $Y_{m-1}$ nor to the signal line $Y_m$ between the instant $t=T_1$ and the instant $t=T_1+\tau_2$. However, a bipolar pulse is applied only to the signal line $X_{n-1}$. This bipolar pulse releases the electric charge stored in the liquid crystal cells $Z_{n-1,m-1}$ and $Z_{n-1,m}$. Since no pulse is applied to the signal line $X_n$, the cells $Z_{n,m-1}$ and $Z_{n,m}$ not connected with the signal line $X_{n-1}$ are not electrically discharged. Then, a rectangular pulse persisting for $\tau_1$ from the instant $t=T_1+\tau_2$ is applied to both signal lines $Y_{m-1}$ and $Y_m$. A bipolar pulse is applied only to the signal line $X_{n-1}$ around the instant $t=T_1+\tau_2$. Thus, the liquid crystal cells $Z_{n-1,m-1}$ and $Z_{n-1,m}$ are electrically charged and activated. Thereafter, the first rectangular pulse persisting for $\tau_1$ is made to cease.

Then, any pulse voltage is applied neither to the signal line $Y_{m-1}$ nor to the signal line $Y_m$ between the instant $t=T_1+\tau_1+\tau_2$ and the instant $t=T_1+\tau_1+2\tau_2$. However, a bipolar pulse is applied only to the signal line $X_n$ thus discharging the liquid crystal cells $Z_{n,m-1}$ and $Z_{n,m}$. Because no pulse is applied to the signal line $X_{n-1}$, none of the cells $Z_{n-1,m-1}$ and $Z_{n-1,m}$ not connected with the signal line $X_n$ are electrically discharged. A rectangular pulse persisting for $\tau_1$ from the instant $t=T_1+\tau_1+2\tau_2$ is impressed only on the signal line $Y_{m-1}$ A bipolar pulse is applied only to the signal line $X_n$ around the instant $t=T_1+\tau_1+2\tau_2$ this pulse is not applied to the signal line $X_{n-1}$. In this manner, both liquid crystal cells $Z_{n,m-1}$ and $Z_{n,m}$ are electrically charged and activated. The first rectangular pulse persisting for $\tau_1$ is then caused to cease.

Pulse voltages can be applied to arbitrary liquid crystal cells by repeating the process described above. Also in this case, four gray tones can be produced, in the same manner as in the process illustrated in FIG. 9. Since the pulse durations of the voltages applied to the liquid crystal cells vary little, the problems with the scheme of FIG. 9 can be solved. However, the peripheral circuits are more complex than those of FIG. 9, because bipolar pulses applied to the signal lines $X_1, X_2, \ldots, X_N$ for electric discharge of the liquid crystal cells must be controlled separately at a high speed.

In this way, four gray levels are produced. Sixty four and 258 gray levels can be obtained by extending the scale of this circuit. Specific examples of the invention are given below.

EXAMPLE 1

A liquid crystal electro-optical device corresponding to the equivalent circuit shown in FIG. 3 was fabricated and operated. Two p-channel TFTs and two n-channel TFTs were formed per pixel. FIG. 4(A) is a plan view of a substrate on which complementary TFT configurations of this example are formed. FIG. 4, (B) and (C), are cross-sectional views taken on lines A—A' and B—B', respectively, of FIG. 4(A). The TFTs are fabricated as illustrated in FIG. 5, (A)–(E). It is to be noted that the components are not drawn to scale and that particulars are omitted.

The manner in which two p-channel TFTs 41 or two n-channel TFTs 40 are fabricated is now described by referring to FIG. (A)–(E). The p-Channel TFTs and n-channel TFTs are fabricated by the same process except for the introduced dopant.

Figure 5A:
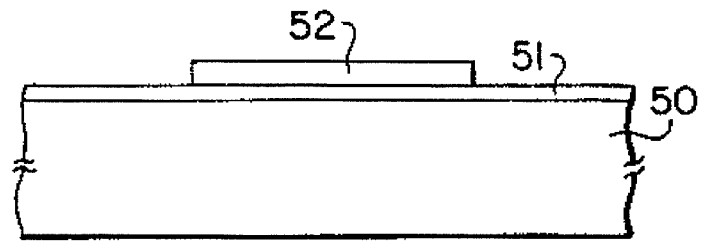
FIG. 5, (A)–(E), are cross-sectional views illustrating a sequence of steps carried out to fabricate TFTs used in the device shown in FIG. 3.

First, a substrate 50 was prepared from a glass withstanding thermal treatment at about 600° C., such as AN glass manufactured by Asahi Glass Company, Ltd., Japan, or Pyrex. A silicon oxide film 51 acting as a blocking layer was formed on the substrate 50 up to a thickness of 1000 to 3000 Å by RF (high frequency) sputtering with a magnetron. The ambient was 100% oxygen. The film was created at 150° C. The output of the magnetron was 400 to 800 W. The pressure was 0.5 Pa. The target was made of quartz or a single crystal of silicon. The sputtering rate was 30 to 100 Å/min. A silicon film 52 was formed on this film 51 by LPCVD (low-pressure chemical vapor deposition), sputtering, or plasma-assisted CVD. Then, the laminate was patterned by a known photolithographic patterning process. In this way, a shape as shown in FIG. 5(A) was derived.

When this silicon film was being formed by LPCVD, disilane ($Si_2H_6$) or trisilane ($Si_3H_8$) was supplied to the CVD apparatus at a temperature lower than the crystallization temperature by 100° to 200° C. such as 450° to 550° C., e.g., 530° C. The pressure inside the reaction furnace was 30 to 300 Pa. The film was formed at a rate of 50 to 250 Å/min. In order that the n-channel and p-channel TFTs have substantially the same threshold voltage Vt, boron taking the form of diborane may be implanted into the film at a dopant concentration of $1\times10^{14}$ to $1\times10^{17}$ atoms/cm$^3$ during the film formation.

Where this silicon film was formed by sputtering, the back pressure created prior to the sputtering was $1\times10^{-5}$ Pa or less. The target was made of a single crystal of silicon. The ambient consisted of argon to which 20–80% hydrogen was added. For example, argon accounted for 20%, while hydrogen accounted for 80%. The film was created at 150° C. The frequency was 13.58 MHz. The output of the magnetron was 400 to 800 W. The pressure was 0.5 Pa.

When this silicon film was formed by plasma-assisted CVD, the temperature was 300° C., for example. Monosilane ($SiH_4$) or disilane ($Si_2H_6$) was used as a reactive gas. This reactive gas was admitted into the PCVD apparatus, and RF (high frequency) electric power of 13.56 MHz was applied to form the film.

Preferably, the oxygen content of the film formed by these methods is $7\times10^{20}$ atoms/cm$^3$ or less. If the oxygen content is high, it is difficult to crystallize the semiconductor layer. In this case, therefore, it is required to elevate the annealing temperature or to increase the anneal time. If the oxygen content is too small, then the leakage current in OFF condition increases when the semiconductor layer is illuminated with backlight which is used for the liquid crystal electro-optical device. Therefore, crystallization can be readily realized by a thermal anneal at a moderate temperature of 600° C. or lower within the range from $4\times10^{19}$ to $4\times10^{21}$ atoms/cm$^3$. The impurities contained in the film used in the present embodiment were investigated by secondary ion mass spectrometry. The oxygen content was $8\times10^{18}$ atoms/cm$^3$. The carbon content was $3\times10^{16}$ atoms/cm$^3$. The hydrogen content was $4\times10^{20}$ atoms/cm$^3$ which was 1 atomic % of the silicon content of $4\times10^{22}$ atoms/cm$^3$.

To promote the crystallization in the source and drain regions further, the oxygen content is set $7\times10^{20}$ atoms/cm$^3$ or less, preferably $7\times10^{19}$ atoms/cm$^3$ or less. Also, oxygen, carbon, or nitrogen ions are implanted into only parts of the channel formation regions of the TFTs forming pixels at a dopant concentration of $5\times10^{19}$ to $5\times10^{21}$ ions/cm$^3$ so that the sensitivity to light may drop. In this case, it is possible to reduce the oxygen contents of the TFTs forming peripheral circuits. Thus, the carrier mobility in these TFTs are made larger. This facilitates operation at high frequencies. Additionally, the leakage current from the switching TFTs around the pixels in OFF state can be reduced.

The oxygen content of the film formed by these methods is preferably $7\times10^{19}$ atoms/cm$^3$ or less, more preferably $1\times10^{19}$ atoms/cm$^3$ or less, because the crystallization is promoted under these typical crystallization conditions.

After the amorphous silicon film was deposited to 500 to 3000 Å, e.g., 1500 Å, in this way, the laminate was heated at a moderate temperature between 450° C. and 700° C. for 12 to 70 hours within a non-oxidizing ambient. For instance, the temperature was maintained at 600° C. within nitrogen or hydrogen ambient. Since the amorphous silicon oxide film was formed under the silicon film and on the surface of the substrate, no specific nuclei existed during this thermal treatment. The whole laminate was annealed uniformly. Specifically, during the formation of the film, it had an amorphous structure, and the hydrogen was merely added. The annealing caused the silicon film to shift from the amorphous structure to a highly ordered state. Portions of the silicon film assumed a crystalline state. Especially, those regions which assumed a comparatively ordered state during the formation of the silicon film tended to crystallize. However, intervening silicon atoms between these highly ordered regions couple together these regions and, therefore, the silicon atoms attract each other. Measurement by laser Raman spectroscopy has shown that peaks shifted toward lower frequencies from the peak 522 cm$^{-1}$ of a single crystal of silicon existed. Calculation from the halfwidth values has revealed that the apparent particle diameters ranged from 50 to 500 Å. That is, they resembled microcrystallites. In practice, however, there existed numerous crystalline regions, i.e., clusters were produced. These clusters were anchored to each other by the silicon atoms. It can be said that the resulting coating had a semi-amorphous structure. Substantially no grain boundaries existed in this coating. Since carriers can move easily from cluster to cluster through the anchored locations, the carrier mobility is higher than polycrystalline silicon having clear grain boundaries. More specifically, the Hall mobility ($\mu$h) is 10 to 200 cm$^2$/V.sec, and the electron mobility ($\mu$e) is 15 to 300 cm$^2$/V.sec.

If the coating is made polycrystalline by an anneal at a high temperature between 900° C. to 1200° C. rather than by an anneal at a moderate temperature, then the impurities in the coating segregate because of solid-phase growth from nuclei. A large amount of impurities such as oxygen, carbon, and nitrogen is contained in the grain boundaries. The mobility within the crystal is large. However, movement of the carriers is impeded by the barriers formed by the grain boundaries. The result is that it is difficult to obtain a mobility of 10 cm$^2$/V.sec or more.

Figure 5B:
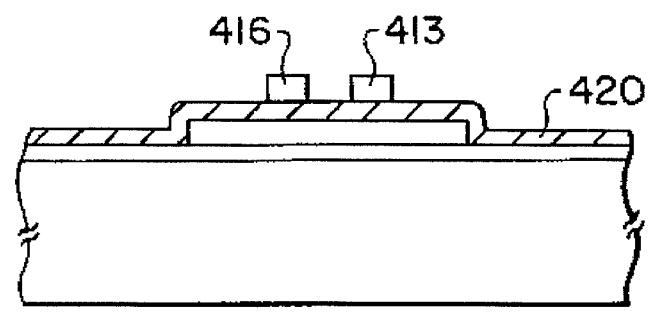

As described above, in the present example, a semi-amorphous or semi-crystalline silicon semiconductor was used. A silicon oxide film was formed on this semiconductor as a gate insulating film 420 up to a thickness of 500 to 2000 Å, e.g., 1000 Å. This film 420 was formed under the same conditions as the silicon oxide film 51 acting as the blocking layer. During the formation of this film, a small amount of fluorine might be added. Subsequently, a metal coating of aluminum was formed on the film 420. This was patterned into gate electrodes 413 and 416, using a photomask. For example, the channel length was 10 μm, and the thickness was 0.3 μm. As a result, a shape as shown in FIG. 5(B) was derived. Extensions of these gate electrodes also formed electrode wirings 43 and 44 extending along the Y-axis as shown in the plan view of FIG. 4(A).

The gate electrodes were made of aluminum. Other metals such as molybdenum and chromium, and doped silicon film can also be employed as the material of the gate electrodes. Where the gate electrodes are made of aluminum as in the present example, the surrounding portions are anodic oxidized. Using the oxidized film, contact holes for the electrodes connected to the source and drain regions can be formed so as to be self-aligned.

Feeding points can be formed close to the channel regions. This reduces the effects of the resistive components of the source and drain regions.

Figure 5C:
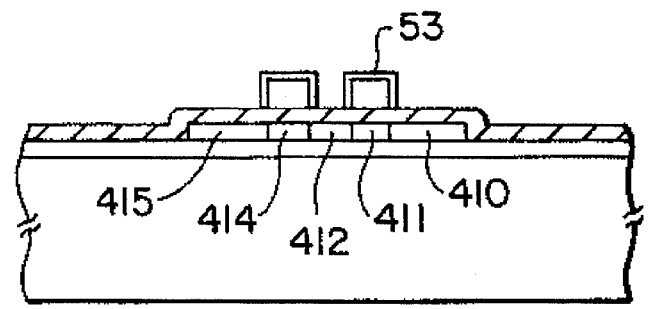

Referring to FIG. 5(C), a photoresist was formed, using a photomask. The mask was created over the n-channel TFT regions. First, p-channel TFTs were fabricated. For this purpose, boron ions were implanted into the source and drain regions 410, 412, and 415 at a concentration of $1 \times 10^{15}$ ions/cm$^3$, using the gate electrodes as a mask, by self-aligned doping.

Where n-channel TFTs are fabricated, phosphorus ions are implanted at a dopant concentration of $1 \times 10^{15}$ ions/cm$^3$ to form the source and drain of the n-channel TFTs. In the present example, the p-channel TFTs 41 and the n-channel TFTs 40 run parallel as shown in FIG. 4(A). Therefore, in order to fabricate individual TFTs, the TFT regions on one side may be masked, using a photoresist.

This ion implantation was effected through the gate insulating film 420. In FIG. 5(B), the silicon oxide on the silicon film may be removed, using the gate electrodes 413 and 416 as a mask, and then boron or phosphorus ions may be directly implanted into the silicon film.

Thereafter, the laminate was annealed again at 600° C. for 10 to 50 hours. Doped regions (FIG. 4(C)) of the n-channel TFTs and doped regions of the p-channel TFTs were activated to form n$^+$ and p$^+$ regions. A channel formation region 411 consisting of a semi-amorphous semiconductor was formed under the gate electrode 413. A channel formation region 414 consisting of a semi-amorphous semiconductor was formed under the gate electrodes 418.

In this way, complementary TFT configurations shown in FIG. 4, (A)–(C), can be fabricated without requiring any step carried out above 700° C. in spite of the self-aligned doping. Consequently, it is not necessary that the substrate be made of an expensive material such as quartz. This process is quite suited for the fabrication of a liquid crystal electro-optical device having a very large number of pixels.

The anneal was carried out twice, as shown in FIG. 5, (A) and (C). However, depending on the demanded characteristics, the anneal illustrated in FIG. 5(A) can be omitted. In this case, the time required for the fabrication can be shortened.

Figure 5D:
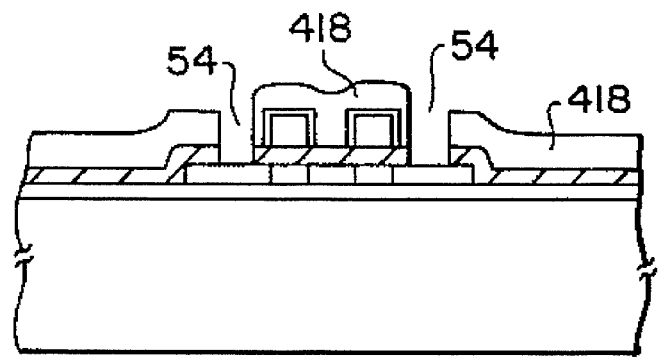
Figure 5E:
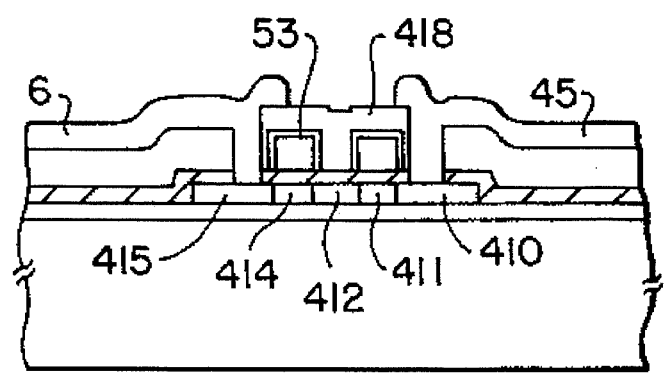

Before or after the annealing step illustrated in FIG. 5(C), the surfaces of the gate electrodes 413 and 416 were anodic oxidized to form an insulating film 53 of aluminum oxide. Then, as shown in FIG. 5(D), a silicon oxide film acting as an interlayer insulator 418 was formed on the insulating film 53 by the above-described sputtering process. This silicon oxide film could also be formed by LPCVD or photo-assisted CVD. For example, the thickness of this silicon oxide film is 0.2 to 0.4 μm. Subsequently, openings 54 for electrodes were formed, using a photomask. At this time, contact holes could be formed in the interlayer insulator with ends of the contact holes aligned with ends of the aluminum oxide films 53, to reduce the distance between the feeding points for the doped regions and their respective channel formation regions.

Then, aluminum was sputtered on the whole laminate. Conductive interconnects 45 were fabricated on the substrate, using a photomask. Thereafter, as shown in FIGS. 4(A), 4(B) and 4(C), an indium tin oxide (ITO) film 6 was formed by sputtering in order that four TFTs formed a complementary TFT configuration and that their output terminals 405 and 415 were connected with transparent electrodes 6 by contacts 31, each transparent electrode 6 serving as one of each pair of pixel electrodes in the liquid crystal display. This film was etched, using a photomask, to form the pixel electrodes 6 on the substrate. This ITO film was formed at a temperature between room temperature and 150° C . Then, the film was annealed at 200° to 400° C. within oxygen or atmospheric ambient. In this way, two p-channel TFTs 41, two n-channel TFTs 40, and the electrodes 6 of the transparent conductive film were formed on the same glass substrate 50. The characteristics of these p-channel TFTs (PTFTs) and n-channel TFTs (NTFTs) are listed in Table 1 below.

TABLE 1

|  | mobility (cm$^2$/V · sec) | Vth (threshold voltage) |
| --- | --- | --- |
| PTFTs | 20 | −3 |
| NTFTs | 30 | +3 |

TFTs having large mobilities could be fabricated by the use of such a semiconductor, which could have generally been considered to be impossible to achieve. Therefore, complementary TFTs acting as the active elements of the liquid crystal electro-optical device shown in FIG. 4, (A)–(C), could be first fabricated.

In the present example, the TFTs are of the planar type. The present invention is not limited to this type. The present invention may also be embodied, using other TFT structures such as the staggered type.

Referring to FIG. 4(A), conductive interconnects 43 and 44 which included the signal lines $V_{GG1}$ and $V_{GG2}$ and extended along the X-axis were formed on the substrate. These interconnects are hereinafter also referred to as the X lines. Conductive interconnects 45 and 46 which included the signal lines $V_{DD1}$ and $V_{DD2}$ and extended horizontally were formed. These interconnects are hereinafter also referred to as the Y lines.

FIG. 4(A) is a plan view. FIG. 4(B) is a vertical cross section taken on line A—A' of FIG. 4(A). FIG. 4(C) is a vertical cross section taken on line B—B40 of FIG. 4(A). Two n-channel TFTs 40 and two p-channel TFTs 41 were formed at the intersection of the Y line $V_{DD1}$ and the X line $V_{GG1}$ and together formed a complementary TFT configuration. Similar complementary TFT configurations were formed for other pixels as shown. All of these complementary TFT configurations were arranged in rows and columns. One source and one drain of the n-channel TFTs 40 and p-channel TFTs 41 forming one complementary TFT configuration were connected with the transparent conductive film 6 via the contacts 31, the conductive film 6 being a pixel electrode. The other source and drain were connected with the Y line 45 by a contact 30, the Y line 45 being one of signal lines forming a matrix line structure. All the gate electrodes of the n-channel and p-channel TFTs were connected with the aluminum conductor of the X line 43 that was one of the signal lines. That is, the two p-channel TFTs were connected in series between the pixel electrode and the X signal line 43. Similarly, the two n-channel TFTs were connected in series between the pixel electrode and the X signal line 43. These four TFTs together formed a complementary TFT configuration.

In this way, one pixel was formed by the complementary TFT configuration consisting of the transparent conductive film 6 together with the four TFTs within the region surrounded by the two X lines and the two Y lines. This structure is repeated horizontally and vertically to form a liquid crystal electro-optical device having a large number of pixels, such as 840×480 pixels or 1280×980 pixels, which is an enlargement of the 2×2 matrix.

An orientation film was formed on the transparent conductive film of the liquid crystal driving elements formed on the substrate constructed as shown in FIG. 4, (A)–(C) and was subjected to orientation treatment. This substrate and another substrate having other pixel electrodes were disposed by a well-known method such that a given distance was maintained between them. A liquid crystal material was injected into the gap to form an electro-optical modulating layer comprising the liquid crystal material between the substrates. The liquid crystal electro-optical device was then completed. Where a twisted nematic liquid crystal is used as the liquid crystal material, the distance between the substrates is set to about 10 μm. Also, it is necessary to form a rubbed orientation film on each transparent conductive film.

Where a ferroelectric liquid crystal is employed as the liquid crystal material, the operating voltage is ± 20 V. The distance between the substrates is set to 1.5 to 3.5 μm, e.g., 2.3 μm. An orientation film is formed only on the counter electrode and rubbed.

Where a dispersion or polymeric liquid crystal is used, no orientation film is needed. To make the switching speed large, the operating voltage is set to ±10 to ±15 V. The cell spacing, or the distance between the substrates holding the liquid crystal therebetween, is as small as 1 to 10 μm. Especially, where a dispersion liquid crystal is used, no polarizer sheet is necessary. Therefore, the quantity of light can be made large, irrespective of whether the device is of the reflection type or of the transmittance type. Since this liquid crystal has no threshold voltage, a large contrast can be obtained by the use of the novel complementary TFT configurations characterized by having distinct threshold voltages. Also, crosstalk between adjacent pixels can be prevented.

In the present example, semi-amorphous or semi-crystalline semiconductor devices are used. Obviously, semiconductors having other crystalline structures may be used as long as they fulfill the same function.

Also, in the present example, a liquid crystal display is employed as one example of liquid crystal electro-optical device. Obviously, the novel complementary TFT configurations can be used as the elements driving the pixels of a display device in which voltages are applied to the pixel electrodes, for providing some form of display.

The present invention is characterized in that a plurality of TFTs are arranged so as to form a complementary TFT configuration per pixel and that the pixel electrode 8 is placed at the liquid crystal potential $V_{LC}$ which settles in one of two levels, depending on whether the p-channel TFTs are ON and the n-channel TFTs are OFF or vice versa.

Figure 10:
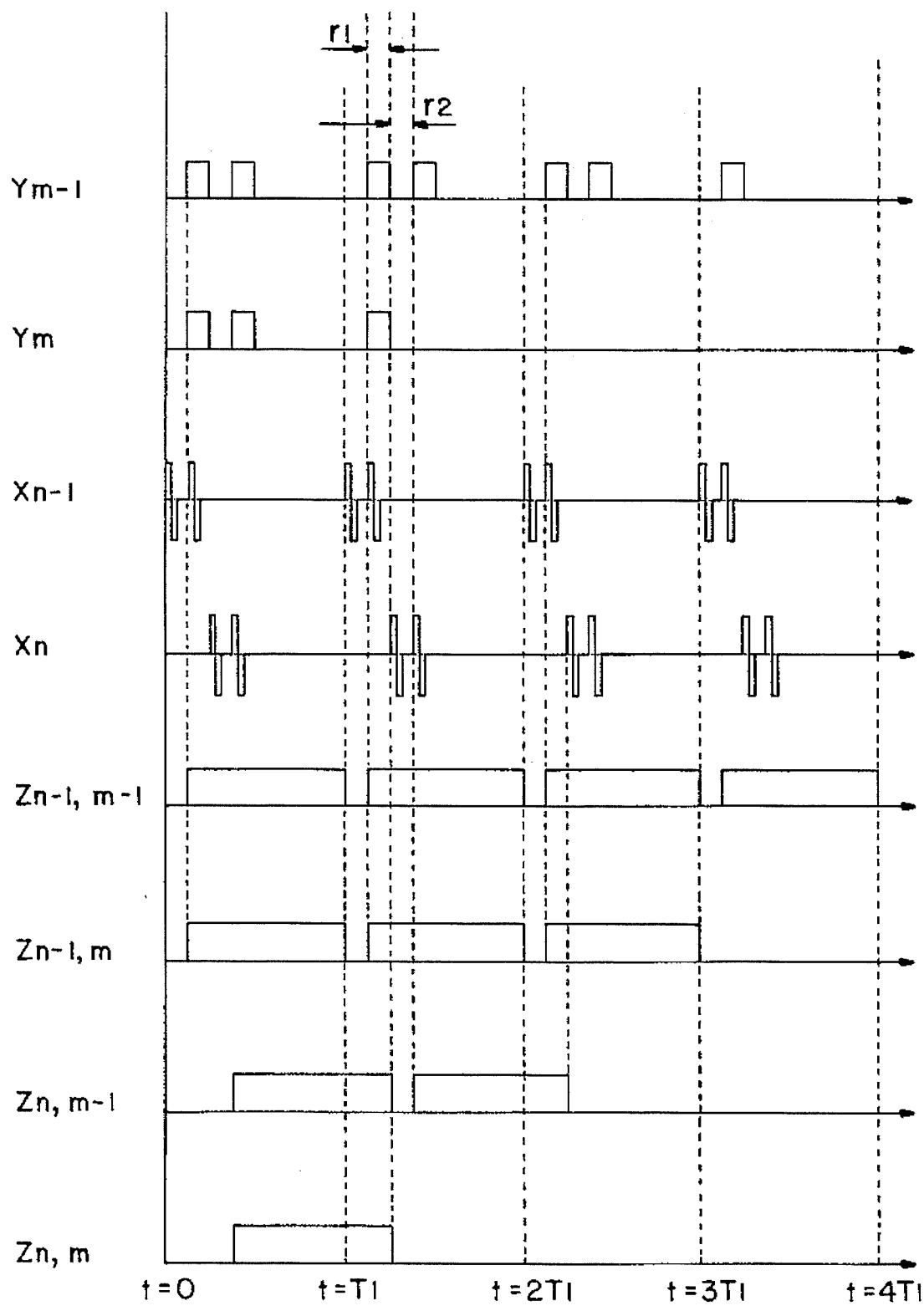
FIG. 10 is a waveform diagram of other signals produced in carrying out the present invention.

The principle of operation of the present example of complementary TFT configuration is now described by referring to FIG. 8. Signal voltages are applied between a pair of signal lines $V_{DD1}$ and $V_{DD2}$ and between a pair of signal lines $V_{GG1}$ and $V_{GG2}$ shown in FIG. 3 to apply voltages to the pixels, for causing the liquid crystal to exhibit the electro-optical effect. FIG. 8 is a waveform diagram of signal voltages applied to these four signal lines and to the counter electrode on the other substrate, for applying a voltage to the liquid crystal located at a point A lying at the intersection of the signal lines $V_{DD1}$ and $V_{GG1}$. As can be seen from FIG. 6, one frame is divided into two, since what is shown in FIG. 3 is a 2×2 matrix. The voltage actually applied to the liquid crystal 3 is referred to as the "block A voltage" in this figure. It is to be noted that only two states, i.e., ON and OFF states, are shown. Where a display is provided at various gray levels, the voltage signal waveforms applied to the signal line $V_{DD1}$ or $V_{DD2}$ or the voltage signal waveforms applied to the signal line $V_{GG1}$ or $V_{GG2}$ are varied as shown in FIGS. 9 and 10, respectively. The signal lines $Y_{m-1}$, $Y_m$, $X_{n-1}$ and $X_n$ shown in FIGS. 9 and 10 should be read as $V_{DD1}$, $V_{DD2}$, $V_{GG1}$ and $V_{GG2}$ respectively.

One frame is set to the time between the instant t=0 and the instant t=4$T_1$. In the illustrated example, $T_1$= 10 μsec. A twisted nematic liquid crystal was used as the liquid crystal material. In this manner, four gray levels could be produced. Also, we have confirmed that 256 gray tones could be generated by setting $T_1$ equal to 130 μsec and dividing the period of 33 msec of one frame into 256 intervals each of which has a duration of 130 μsec.

Figure 6:
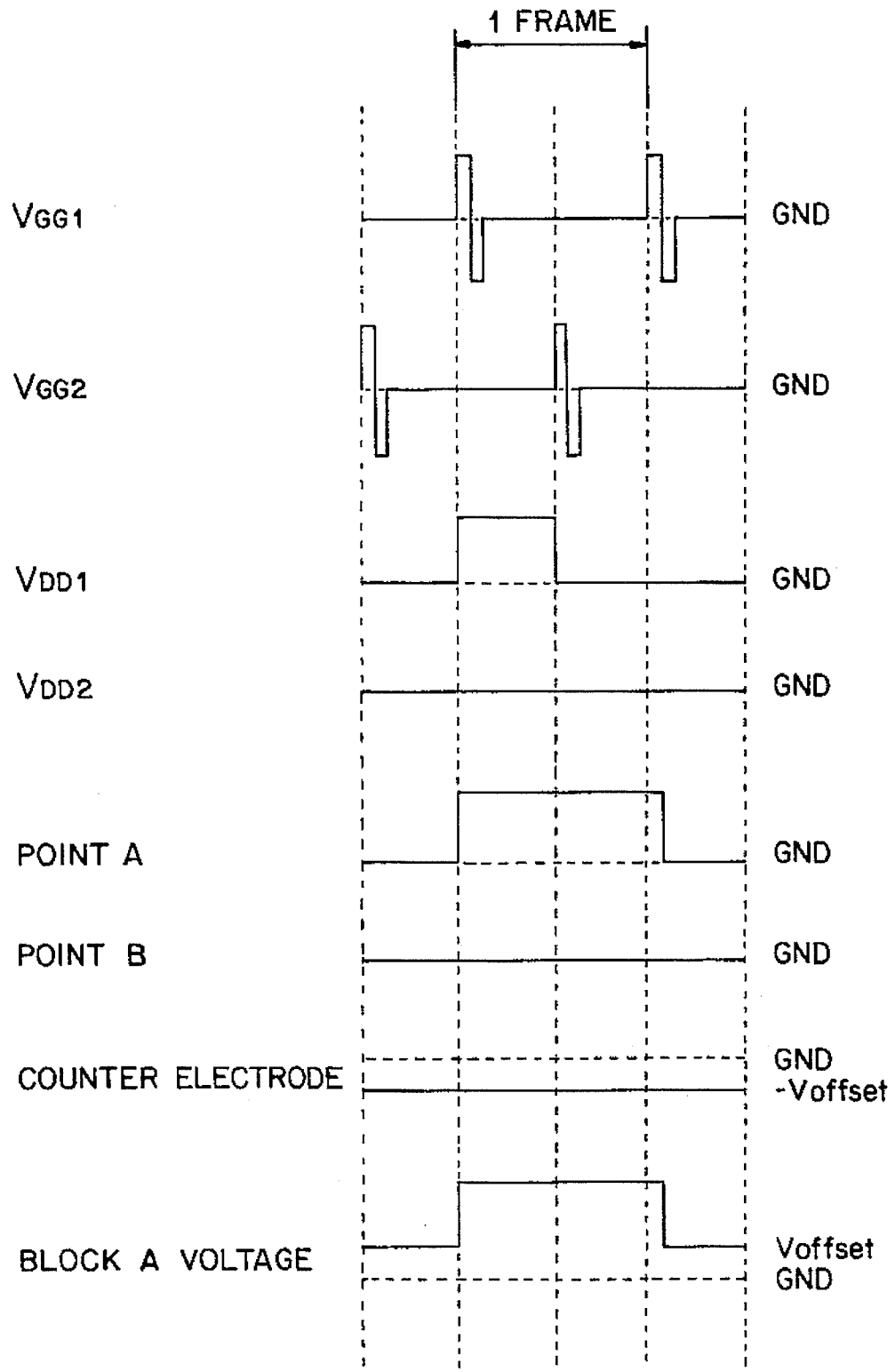
FIG. 6 is a waveform diagram of signals for activating the complementary TFT configuration of 2×2 matrix shown in FIG. 3.

Meanwhile, the signal voltage $V_{GG}$ applied to the signal lines $V_{GG1}$ and $V_{GG2}$ must be larger than the threshold voltage Vth of the complementary TFT configuration, i.e., $V_{GG}$>>Vth. The threshold voltage $V_{OFFSET}$ shown in FIG. 6 is the voltage level at which the liquid crystal begins to respond to the applied voltage. Applying a negative voltage as the threshold voltage $V_{OFFSET}$ to the counter electrode is effective in providing a display at various gray levels, making use of the relation of the voltage applied to the liquid crystal to the transmittance of the liquid crystal.

If only one p-channel TFT and only one n-channel TFT are provided between the pixel electrode and the signal line $V_{DD1}$ or $V_{DD2}$ and one of them malfunctions due to a short circuit or leakage, the signal voltage applied to the signal line $V_{DD1}$ or $V_{DD2}$ is directly applied to the pixel of the liquid crystal, independent of a selection signal applied to the signal line $V_{GG1}$ or $V_{GG2}$. In this case, either ON state or OFF state is maintained. However, in accordance with the present invention, two p-channel TFTs 41 and two n-channel TFTs 40 are connected in series between the signal line $V_{DD1}$ or $V_{DD2}$ and the pixel electrode. Therefore, even if a short circuit occurs between the source and the drain of any one TFT, the other TFT can control the activation of the pixel. Consequently, the operation of the defective TFT can be compensated for. This contributes to an improvement in the production yield of the liquid crystal electro-optical device.

At the same time, these four TFTs together constitute a complementary TFT configuration which prevents instability of the liquid crystal potential which would have been encountered in the prior art device. In consequence, the liquid crystal potential can be retained at the desired level. As a result, the liquid crystal can exhibit the electro-optical effect stably.

EXAMPLE 2

This example is a liquid crystal electro-optical device constructed as shown in FIG. 7, (A)–(C). FIG. 7(A) is a plan view of this device. FIG. 7(B) is a cross-sectional view taken on line A—A' of FIG. 7(A). FIG. 7(C) is a cross-sectional view taken on line B—B' of FIG. 7(A). An equivalent circuit of this example is built as shown in FIG. 1. Four TFTs together form a switching device portion. One p-channel TFT and one n-channel TFT form a complementary TFT pair. Two complementary TFT pairs are connected in series between the signal lines $V_{DD1}$ or $V_{DD2}$ and the pixel electrode 6.

In the present example, the transparent conductive film 6 is first formed and then patterned into the pixel electrodes 6. In Example 1, the transparent conductive film 6 acting as the pixel electrodes is formed in the final step. Simultaneously with the formation of the pixel electrodes 6, an electrode portion 703 connecting one complementary TFT pair with the other complementary TFT pair is formed. In this way, the novel configuration can be obtained without destroying the underlying devices or without breaking the conductive interconnects during the patterning of the transparent conductive film made of, for example, ITO.

In the present example, all the positions of the two p-channel TFTs 71 and 72 and of the two n-channel TFTs 73 and 74 are electrically equivalent. The same advantages can be had as obtained in Example 1. Furthermore, the TFTs can be disposed at any desired position according to the degree of necessity in the process of manufacturing the TFTs.

P-channel TFTs 71 and 72 are formed as inverse staggered type TFTs. These TFTs 71 and 72 have gate electrodes 75 and 76, respectively. The TFT 71 further includes a source region 700 and a drain region 702 which are formed on a gate insulating film 708. Similarly, the TFT 72 further includes a source region 704 and a drain region 706 which are formed on a gate insulating film 709.

In the present example, a silicon semiconductor layer fabricated by PCVD is annealed to form these semiconductor layers while promoting the crystallization. The n-channel TFTs (not shown) are similar to the p-channel TFTs in structure. In the illustrated example, the n-channel TFTs are disposed in a side-by-side relation to the p-channel TFTs. The present invention is not limited to this positional relation. Rather, the p-channel TFTs and the n-channel TFTs can be arranged in any desired positional relationship. The manufacturing process is similar to the process of Example 1 in other respects and so these similar steps are not described.

In the present invention, complementary TFT pairs are connected in series because the invention assumes that some TFTs malfunction due to a short circuit or a leakage between the source and the drain. If any TFT malfunctions due to destruction of the gate insulating film, it is necessary to electrically disconnect the gate electrode of the defective TFT from the signal line to ensure the operation of the liquid crystal electro-optical device. If the complementary TFT pairs are connected in series, and if the gate electrode is disconnected, then all the TFTs operating on that gate electrode cannot operate with undesirable result. In this case, a plurality of complementary TFT configurations are connected in parallel. Thus, if any TFT malfunctions, then it is easy to electrically disconnect the gate electrode of the defective TFT. However, it is necessary that the source and drain regions be connected with separate power lines. Hence, the layout pattern is required to be devised, taking account of this fact.

The liquid crystal device of 2×2 matrix fabricated in the present example was driven with the same signals as used in Example 1, and we have confirmed that 256 gray tones could be produced.

EXAMPLE 3

In the present example, TFTs were fabricated from laser annealed polysilicon semiconductor. The TFTs were identical in circuit configuration and structure to the TFTs shown in FIGS. 3 and 4. Also, the manufacturing process was similar to the process illustrated in FIG. 5, (A)–(E). Therefore, the present example is next described by referring to FIG. 5, (A)–(E).

First, a substrate 50 was prepared from an inexpensive glass (i.e., excluding quartz glass) withstanding thermal treatment at a temperature lower than 700° C. , e.g., 600° C. A silicon oxide film 51 acting as a blocking layer was formed on the substrate 50 up to a thickness of 100 to 300 nm by RF (high frequency) sputtering with a magnetton. The ambient was substantially 100% oxygen. The concentration of gases other than oxygen was less than 0.1%. The film was created at 150° C. The output of the magnetton was 400 to 800 W. The pressure inside the chamber was 0.5 Pa during the film formation. The target was made of quartz or a single crystal of silicon. The sputtering rate was 3 to 10 nm/min. under these conditions.

A silicon film was formed on this film at a temperature of 250° to 350° C. (320° C. in the present example) by plasma assisted CVD. Monosilane ($SiH_4$) was used. Instead, disilane ($Si_2H_6$) or trisilane ($Si_3H_8$) can be used. This was admitted into the PCVD apparatus at a pressure of 3 Pa, and RF electric power of 13.56 MHz was applied to form the film. The appropriate range of the RF electric power is between 0.02 and 0.10 $W/cm^2$. In the present example, the power was 0.055 $W/cm^2$. The flow rate of the monosilane was 20 SCCM. The deposition rate was 12 nm/min. In order that the p-channel TFTs be substantially identical threshold voltage to the n-channel TFTs, boron in the form of diborane ($B_2H_6$) may be added during the formation of the film at a concentration of $1\times10^{15}$ to $1\times10^{18}$ atoms/$cm^3$. The silicon layer which forms the channel regions of the TFTs may be created by sputtering or low pressure CVD, as well as by plasma-assisted CVD.

Where the sputtering was employed, the back pressure produced prior to the sputtering was $1\times10^{-5}$ Pa. A single crystal of silicon was used as a target. The sputtering operation was carried out within an ambient of argon to which 20–80% hydrogen was added. For example, argon accounted for 20%, while hydrogen accounted for 80%. The film was formed at 150° C. The RF frequency for the sputtering was 13.56 MHz. The magnetron output was 400 to 800 W. The pressure was 0.5 Pa.

When this silicon film was being formed by LPCVD, disilane or trisilane was supplied to the CVD apparatus at a temperature lower than the crystallization temperature by 100° to 200° C. such as 450° to 550° C. , e.g., 530° C. The pressure inside the reaction furnace was 30 to 300 Pa. The film was formed at a rate of 5 to 25 nm/min. In order that the n-channel and p-channel TFTs have substantially the same threshold voltage, boron taking the form of diborane ($B_2H_6$) may be implanted into the film at a dopant concentration of $1\times10^{15}$ to $1\times10^{18}$ atoms/$cm^3$ during the film formation.

Preferably, the oxygen content of the film formed by these methods is $5\times10^{21}$ atoms/$cm^3$ or less. To promote the crystallization, the oxygen content is preferably $7\times10^{19}$ atoms/$cm^3$ or less, more preferably $1\times10^{19}$ atoms/$cm^3$ or less. If the content is too low, and if the device is used as a backlighted display unit, then the leakage current in OFF condition increases. Conversely, if the oxygen content is too high, it is difficult to crystallize the semiconductor layer. In this case, therefore, it is required to elevate the annealing temperature or to increase the anneal time in the subsequent step. Under this condition, the hydrogen concentration was $4\times10^{20}$ atoms/$cm^3$ which was 1 atomic % of the silicon content of $4\times10^{22}$ atoms/$cm^3$.

To accelerate the crystallization in the source and drain, the oxygen concentration is preferably $7\times10^{19}$ atoms/$cm^3$ or less, more preferably $1\times10^{19}$ atoms/$cm^3$ or less. Ions of oxygen may be implanted only into those channel formation regions of the TFTs which form pixels at a concentration of $5\times10^{20}$ to $5\times10^{21}$ ions/$cm^3$.

An amorphous silicon film 50 to 500 nm thick was formed by the method described above. In the present example, the thickness was 100 nm. This was patterned into silicon film islands 52 by a well-known patterning technique.

Then, the film was laser annealed, using an XeCl excimer laser. The energy of the laser was required to be 130 mJ/$cm^2$ or more. To melt the whole film, an energy of 220 mJ/$cm^2$ or more was needed. However, if the energy of 220 mJ/cm$^2$ is illuminated from the first, then the hydrogen contained in the film will expand rapidly, destroying the film. To avoid this undesirable phenomenon, the hydrogen is first driven off at a low energy, followed by melting of the film. In the present example, the hydrogen was first expelled at 150 mJ/cm$^2$ and then the film was crystallized at 230 mJ/cm$^2$.

The laser annealing caused the silicon film to shift from the amorphous structure to a highly ordered state. Later investigation of the characteristics of the device has shown that the Hall mobility of this silicon film under this condition is 10 to 200 cm$^2$/V.sec. The electron mobility is 15 to 300 cm$^2$/V.sec.

A silicon oxide film 420 was formed as a gate insulating film on the above-described film up to a thickness of 50 to 200 nm, e.g., 100 nm, under the same conditions as used to form the blocking layer 51. A small amount of fluorine may be added to fix sodium ions during the film formation.

Thereafter, an aluminum film 0.1 to 2.0 μm thick was formed by sputtering. In the present example, the thickness of the film was 0.5 μm. Electron-beam evaporation or laser evaporation may also be employed. This film was selectively etched to form gate electrodes 418 and 413. The channel length of the gate electrodes was 7 μm. The aluminum surface was anodic oxidized to form an insulator thereof.

Subsequently, dopants were diffused by ion implantation and self-aligned doping, using the gate electrodes as a mask. Phosphorus and arsenic ions were implanted as the dopants into the n-channel TFTs. Boron ions were implanted as the dopants into the p-channel TFTs. The portions which were made amorphous by implanting ions were recrystallized by laser annealing under the same conditions as in the previous laser annealing. In this way, doped regions 415, 412, and 410 were produced. Also, channel regions 414 and 411 were created. Although only one of the n-channel and p-channel TFTs is shown in FIG. 5, (A)–(E), both are, of course, formed concurrently.

The subsequent steps for forming the elements are exactly the same as the steps of the other examples and so these steps are not described below. A liquid crystal display was fabricated from the elements manufactured in this way. We have confirmed that this display can produce halftones, in the same way as in the other examples.

In the examples described above, all the gate electrodes of one complementary transistor configuration (pair) as switching elements are connected to a common signal line. The present invention is not limited to this structure. Driving method in accordance with the present invention can be applied to an electro-optical device having an electric circuit in which gate electrodes of a transfer gate complementary transistor configuration (pair) connected to one pixel electrode are connected to different signal lines respectively, as shown in FIG. 1(A). One example of arrangement (pattern) of the electric circuit shown in FIG. 11(A) is shown in FIG. 11(B) (plan view).

Figure 11A:
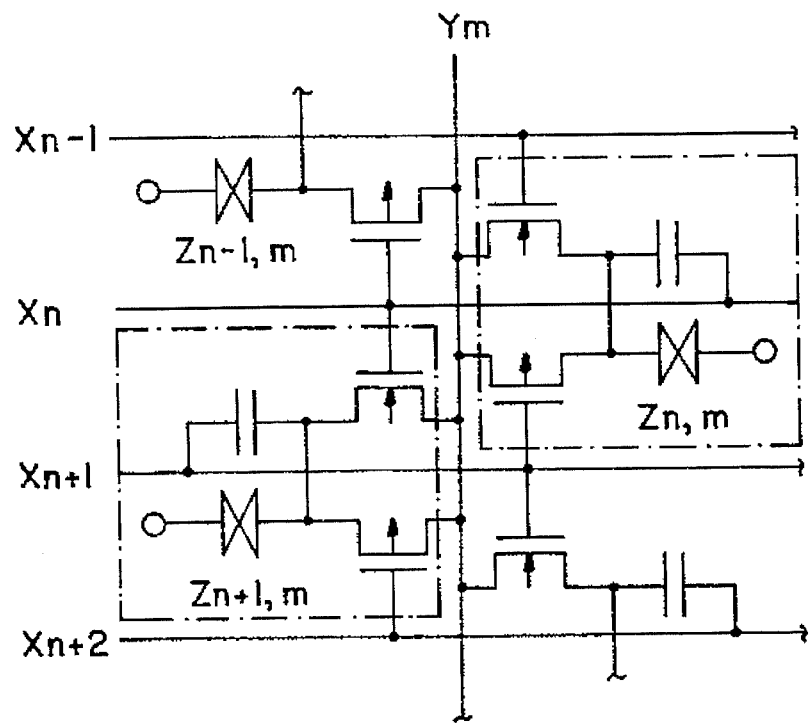
FIG. 11(A) is a schematic circuit diagram of an electro-optical device in accordance with the present invention.
Figure 11B:
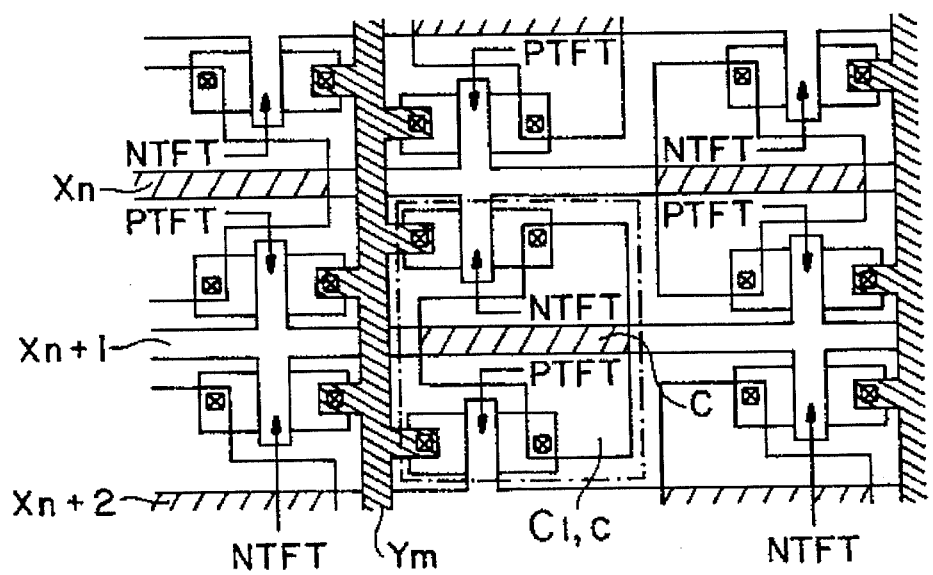
FIG. 11(B) is a schematic view showing arrangement (pattern) of the circuit shown in FIG. 11(A).

Although one complementary transistor pair is provided in one pixel in FIG. 11(A), a plurality of complementary transistor pairs may be provided in one pixel in the same connection as in the example described above.

The present invention pertains to a method of operating an electro-optical device so as to produce gray levels. It is not appropriate to use the prior art circuit which is unstable in operation and operates at a low speed in practicing the novel method. Also, it is substantially impossible to realize the invention, using such prior art circuit. Therefore, in the above examples, the circuit driving the liquid crystal cells was described in detail. In the above examples, silicon TFTs are used. It is also possible to fabricate the TFTs from germanium or a germanium/silicon alloy. Since the electron mobility or Hall mobility of these materials are larger than that of silicon, they are especially adapted for high-speed operation as in the present invention.

As described thus far, the present invention yields an accurate gray scale on the electro-optical device comprising complementary thin film transistors of transfer gate type as elements for switching the pixel electrodes. Where the voltages applied to liquid crystal cells are controlled in an analog fashion as in the prior art techniques, it has been impossible to obtain more than 18 gray levels. We have proved that 258 gray levels can be easily produced by making use of the present invention.

This sufficiently demonstrates that the present invention is industrially valuable.

What is claimed is:

1. A method of driving an active matrix type liquid crystal display device having a liquid crystal layer, a plurality of pixel electrodes arranged in the form of matrix, each of which electrodes is provided with a switching element for applying an electric field to said liquid crystal layer, said method comprising the steps of:

scanning said switching elements with scan signals a predetermined number of times within a unit time;

supplying data signals to predetermined ones of said switching elements during said scanning in order to apply an ON electric field thereto in the form of pulses to said liquid crystal layer through associated ones of said pixel electrodes, wherein the duration of each of said pulses is short enough so that liquid crystal molecules in said liquid crystal layer can not completely follow the applied pulses, and the number of data signals supplied to the switching element in the unit time is a function of the desired tone of an image to be exhibited by said liquid crystal device.

2. The method of claim 1 wherein a gradational display can be exhibited by said device with said predetermined number of data signals.

3. The method of claim 1 wherein each of said switching element has a gate, an input, and an output where said gate is connected to said scan signals, said input is connected to a data signals and said output is connected to an associated one of said pixel electrodes.

4. A method of driving an active type liquid crystal device having a liquid crystal layer, a plurality of pixel electrodes arranged in the form of a matrix, each of which is provided with a switching element, a plurality of row lines connected to a gate of the corresponding switching element, and a plurality of column lines connected to an input terminal of the corresponding switching element, said method comprising the steps of:

(a) scanning said row lines in sequence with a row select signal;

(b) applying a date signal to said column lines in synchronization with the scanning of said row lines in order that an ON voltage is applied to said pixels; and (c) repeating steps (a) and (b) N times where N is an integer;

wherein the number of applications of said data signal during step (c) is varied from 0 to N with the applied ON voltage having a constant duration and a constant amplitude.

5. A method of driving an active type liquid crystal device having a liquid crystal layer, a plurality of pixel electrodes arranged in the form of a matrix, each of which is provided with a switching element, a plurality of row lines connected to a gate of the corresponding switching element, and a plurality of column lines connected to an input terminal of the corresponding switching element, said method comprising the steps of:

(a) scanning said row lines in sequence with a row select signal;

(b) applying a data signal to said column lines in synchronization with the scanning of said row lines in order than an ON voltage is applied to said pixels; and (c) repeating steps (a) and (b) N times where N is an integer and wherein the number of times said data signal is applied during step (c) is varied from O to N depending upon the desired tone of an image to be established by said liquid crystal device;

wherein a duration of the application of said ON voltage at one scanning is short enough so that liquid crystal molecules in said liquid crystal layer cannot completely follow the applied voltage.

6. The method of claim 4 further comprising the step of removing said ON voltage applied to said pixel electrodes before each scanning the corresponding row lines, by scanning said corresponding row lines with another select signal during which said data signal is not applied to the corresponding column line.

7. A method of driving an active type liquid crystal device having a liquid crystal layer, a plurality of pixel electrodes arranged in the form of a matrix, each of which is provided with a switching element, a plurality of row lines connected to a gate of the corresponding switching element, and a plurality of column lines connected to an input terminal of the corresponding switching element, said method comprising the steps of:

(a) scanning said row lines in sequence with a row select signal;

(b) applying a data signal to said column lines in synchronization with the scanning of said row lines in order that an ON voltage is applied to said pixel electrode; and (c) repeating steps (a) and (b) N times where N is an integer, wherein a total duration of applications of said ON voltage during step (c) is monotonously increased with increasing the number of applications of said data signal during step (c).

8. A method of driving an active type liquid crystal device having a liquid crystal layer, a plurality of pixel electrodes arranged in the form of a matrix, each of which is provided with a switching element, a plurality of row lines connected to a gate of corresponding switching element, and a plurality of column lines connected to an input terminal of the corresponding switching element, said method comprising the steps of:

(a) scanning said row fines in sequence with a row select signal comprising a bipolar pulse; and (b) applying a data signal to said column lines in synchronization with the scanning of said row lines in order that an ON voltage having a single polarity is applied to said pixel electrodes.

* * * * *